(12) United States Patent
Bagherinezhad et al.

(10) Patent No.: US 12,217,474 B2
(45) Date of Patent: *Feb. 4, 2025

(54) DETECTION OF MOMENT OF PERCEPTION (71) Applicant: Apple Inc., Cupertino, CA (US)

(72) Inventors: Hessam Bagherinezhad, Seattle, WA (US); Carlo Eduardo Cabanero Del Mundo, Seattle, WA (US); Anish Jnyaneshwar Prabhu, Seattle, WA (US); Peter Zatloukal, Seattle, WA (US); Lawrence Frederick Arnstein, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,266

(22) Filed: Oct. 11, 2023

(65) Prior Publication Data

US 2024/0119699 A1 Apr. 11, 2024

Related U.S. Application Data

(63) Continuation of application No. 17/306,925, filed on May 3, 2021, now Pat. No. 11,816,876, which is a (Continued)

(51) Int. Cl.
*G06V 10/44* (2022.01)
*G06F 18/214* (2023.01)
(Continued)

(52) U.S. Cl.
CPC .......... *G06V 10/454* (2022.01); *G06F 18/214* (2023.01); *G06N 20/00* (2019.01);
(Continued)

(58) Field of Classification Search
CPC .... G06V 10/454; G06V 10/764; G06V 10/82; G06V 20/52; G06V 40/20; G06V 20/44;
(Continued)

(56) References Cited

U.S. PATENT DOCUMENTS 8,620,028 B2 12/2013 Eaton
10,311,342 B1 6/2019 Farhadi et al.
(Continued)

FOREIGN PATENT DOCUMENTS

WO WO 2016/201683 12/2016

OTHER PUBLICATIONS

International Search Report and Written Opinion from PCT/US2020/046863, dated Nov. 26, 2020, 16 pages.
(Continued)

*Primary Examiner* — Phuoc Tran
(74) *Attorney, Agent, or Firm* — BAKERHOSTETLER (57) ABSTRACT

In one embodiment, a method includes receiving an input video comprising a plurality of image frames including an object of interest. Based on the plurality of image frames, a motion associated with the object of interest is determined, and the plurality of image frames are classified using a machine-learning model to identify one of the plurality of image frames that indicates a moment of perception of the determined motion.

20 Claims, 7 Drawing Sheets

Related U.S. Application Data continuation of application No. 16/547,352, filed on Aug. 21, 2019, now Pat. No. 10,997,730.

(51) Int. Cl.

| | |
|---|---|
| *G06N 20/00* | (2019.01) |
| *G06T 7/00* | (2017.01) |
| *G06T 7/20* | (2017.01) |
| *G06V 10/764* | (2022.01) |
| *G06V 10/82* | (2022.01) |
| *G06V 20/52* | (2022.01) |
| *G06V 40/20* | (2022.01) |
| *G06V 20/40* | (2022.01) |

(52) U.S. Cl.
CPC .............. *G06T 7/0002* (2013.01); *G06T 7/20* (2013.01); *G06V 10/764* (2022.01); *G06V 10/82* (2022.01); *G06V 20/52* (2022.01); *G06V 40/20* (2022.01); *G06T 2207/20081* (2013.01); *G06V 20/44* (2022.01)

(58) Field of Classification Search
CPC ..... G06F 18/214; G06N 20/00; G06T 7/0002; G06T 7/20; G06T 2207/20081
See application file for complete search history.

(56) References Cited

U.S. PATENT DOCUMENTS

| | | | |
|---|---|---|---|
| 10,997,730 B2* | 5/2021 | Bagherinezhad | .... G06V 10/764 |
| 11,816,876 B2* | 11/2023 | Bagherinezhad | ...... G06V 40/20 |
| 2009/0087027 A1 | 4/2009 | Eaton | |
| 2017/0270365 A1 | 9/2017 | Laska et al. | |
| 2018/0137362 A1 | 5/2018 | Danielsson et al. | |
| 2018/0357472 A1 | 12/2018 | Dreessen | |
| 2019/0102646 A1 | 4/2019 | Redmon | |

OTHER PUBLICATIONS

Mohan et al., "Anomaly and Activity Recognition Using Machine Learning Approach for Video Based Surveillance," IEEE 10th International Conference on Computing, Communication and Networking Technologies, Jul. 2019, pages.

* cited by examiner

DETECTION OF MOMENT OF PERCEPTION

CROSS REFERENCE TO RELATED APPLICATIONS

This application is a continuation application of U.S. application Ser. No. 17/306,925, filed on May 3, 2021, entitled "DETECTION OF MOMENT OF PERCEPTION," which was a continuation of U.S. application Ser. No. 16/547,352, filed on Aug. 21, 2019, also entitled "DETECTION OF MOMENT OF PERCEPTION," the entirety of which is incorporated herein by reference.

TECHNICAL FIELD

This disclosure generally relates to detection and classification using machine-learning models.

BACKGROUND

Machine-learning techniques have been applied to computer vision problems. Neural networks have been trained to classify images and actions using large datasets with millions of videos and images. The datasets often include videos and images with labels.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers.

Machine-learning techniques have been applied to training data that includes videos with labels, where the entire video is tagged with a label or where objects depicted in the video are detected and labeled. It would be advantageous to provide a machine-learning model trained to detect and label particular moments in the video that correspond to the moment when a human would perceive something of significance in the depicted scene.

SUMMARY OF PARTICULAR EMBODIMENTS

In particular embodiments, a method may involve receiving a machine-learning model that has been trained using a plurality of videos to detect the moment of a specified motion when a human would be able to identify the specified motion. The videos may have at least one frame labeled as a moment of perception for the specified motion. The method may further involve identifying an object-of-interest depicted in an input video. The method may next detect, with respect to a sequence of frames of the input video, a motion of the object-of-interest. The method may next determine that the motion of the object-of-interest may be classified as the specified motion. Finally, the method may label, using the trained machine-learning model, one of the frames of the input video as the moment of perception of the specified motion.

The embodiments disclosed herein contemplate methods and systems for tagging input videos with the moment of perception of specified motions. By identifying the moment of perception for specific motions, machine-learning models may be better trained to identify the moment when a human would be able to identify the specific motion. This will allow for machine-learning models to more accurately mirror the behavior of humans, to predict human reactions, and to pre-emptively assess options for responses to human reactions, which can lead to smarter applications that can more accurately understand human behaviors and appear to have more empathy when interacting with humans. In particular embodiments, this will allow for machine-learning models to more accurately predict and mirror the behavior of animals or any non-human entities.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a method may involve receiving a machine-learning model that has been trained using a plurality of videos to detect the moment of a specified motion when a human would be able to identify the specified motion. The specified motion may be any movement of any human, animal, or object capable of any movement or motion. The moment when a human would be able to identify or perceive a specified motion may be known as a moment of perception. The videos that the machine-learning model was trained on may have at least one frame labeled as a moment of perception for the specified motion. The method may further involve identifying an object-of-interest depicted in an input video. The object-of-interest may be any human, animal, object, or group thereof which may be capable of the specified motion. The method may next detect, with respect to a sequence of frames of the input video, a motion of the object-of-interest. The method may next determine that the motion of the object-of-interest may be classified as the specified motion. Finally, the method may label, using the trained machine-learning model, one of the frames of the input video as the moment of perception of the specified motion.

The embodiments disclosed herein contemplate methods and systems for tagging input videos with the moment of perception of specified motions. By identifying the moment of perception for specific motions, machine-learning models may be better trained to identify the moment when a human would be able to identify the specific motion. This will allow for machine-learning models to more accurately mirror the behavior of humans, to predict human reactions, and to pre-emptively assess options for responses to human reactions, which can lead to smarter applications that can more accurately understand human behaviors and appear to have more empathy when interacting with humans. These more accurate machine-learning models can have applications in a variety of fields including medical diagnosis and treatment, consumer electronics, animatronics, animation, and others. In particular embodiments, this will allow for machine-learning models to more accurately predict and mirror the behavior of animals or any non-human entities. In particular embodiments, these machine-learning models can be built into edge devices such as mobile phones, or other electronic devices without the large computing power found in servers.

Figure 1A:
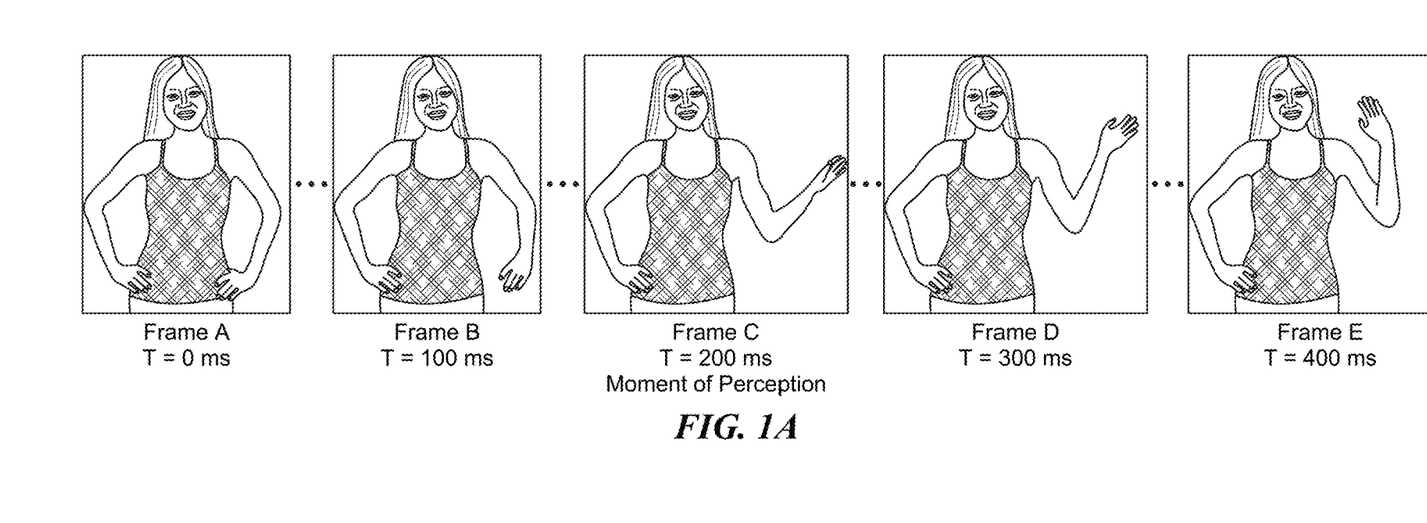
FIG. 1A illustrates an example of the method for determining the moment of perception from an input video.

FIG. 1A illustrates example frames of an input video. The input video comprises a sequence of frames, for example Frame A-Frame E. Each frame may be associated with a timestamp. For example, the first frame, Frame A, may begin at time 0. The next frame, Frame B, may represent an image captured after a particular duration of time after time 0, for example $1/30^{th}$ of a second. The trained machine-learning model has classified Frame C as the moment of perception.

In particular embodiments, the machine-learning model may have been trained to detect a person waving, thereby making a wave the specified motion. The method may first identify that a person depicted in the input video is the object-of interest. Next, the method may detect that the person is making a motion. Then, the method may identify that the motion is a wave. Finally, the method may identify and label one specific frame of the input video as the moment when a human would perceive that person is waving. Although this disclosure describes and illustrates a particular motion, this disclosure contemplates any suitable motion.

In particular embodiments, the method for determining the moment of perception from an input video may include further analyzing the input video to determine one or more factors relating to the input video, wherein the classification of a specific frame of the input video as the moment of perception will be based on the one or more factors. These factors may include the environmental context of the input video, attributes of the object-of-interest, attributes of the specified motion, metadata of the input video, or any other factors concerning the input video. For example, an input video may include metadata indicating that the input video was recorded at a location where the temperature is typically cold, such as *Antarctica*. The input video may further depict a person wearing short sleeves, and the person may be shaking. The machine-learning model may be able to more quickly perceive that the person is shivering, as opposed to some other type of shaking, because of the video location and the clothing of the object-of-interest. In particular embodiments, a factor may be the specific temperature of the object-of-interest directly.

Figure 1B:
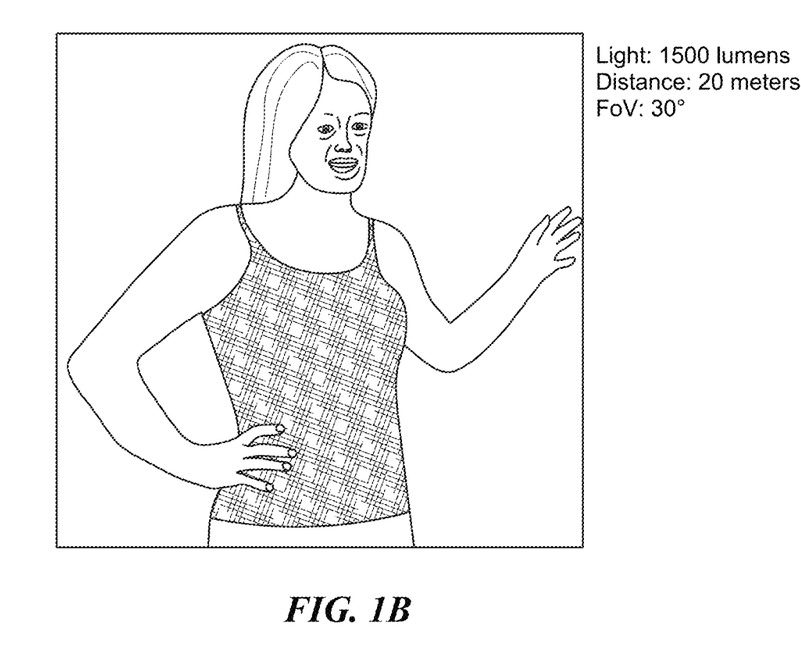
FIG. 1B illustrates an example of environmental context factors being used to calculate the moment of perception.

FIG. 1B illustrates an example of environmental context factors being used to calculate the moment of perception. In particular embodiments, the environmental context factors may include the viewpoint, the lighting, the distance from the object-of-interest, the field-of-view, the diversity in the background, or the climate of the input video. Although this disclosure describes and illustrates particular environmental factors, this disclosure contemplates any suitable environmental factors. For example, an input video may have a lighting level of 1500 lumens which may allow a machine-learning model to determine the moment of perception sooner than if the video was darker. As another example, an input video may depict the object-of-interest 20 meters away from a video camera recording the input video, which may allow a machine-learning model to determine the moment of perception sooner than if the video was taken from a distance further away from the object of interest. As another example, an input video may depict the field of view (FoV) as 30°, which may allow a machine-learning model to determine the moment of perception sooner than if the field of view was smaller. As another example, a machine-learning model may determine the moment of perception sooner if the background behind the object-of-interest is a solid color than if the background is filled with lots of multi-colored objects.

Figure 1C:
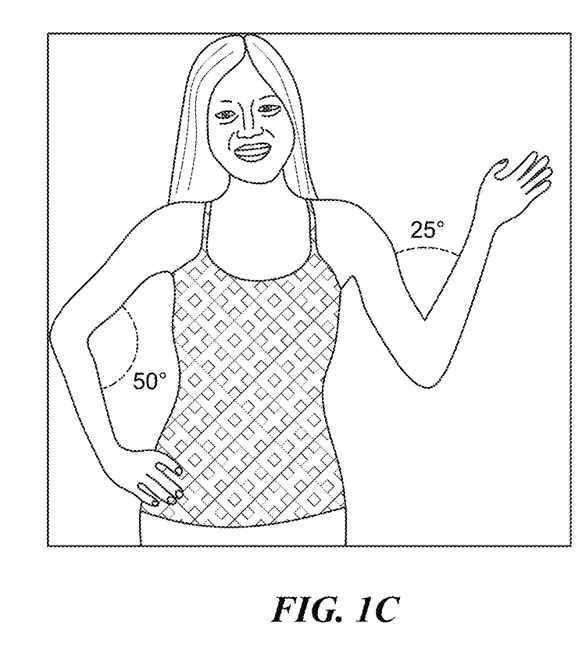
FIG. 1C illustrates an example of attributes of the object-of-interest being used as factors to calculate the moment of perception.

FIG. 1C illustrates an example of attributes of the object-of-interest being used as factors to calculate the moment of perception. In particular embodiments, the attributes of the object-of-interest may include the detected pose, size, color, emotion, texture, or temperature of the object-of-interest. For example, the object-of-interest may be a person wearing a specific uniform, outfit, or article of clothing. As an example, if the object-of-interest is a person wearing a military uniform, the machine-learning model may determine that an arm movement may be likely to be a military salute as well as a wave and may therefore delay the moment of perception until the machine-learning model determines the action is in fact a wave. As another example, the machine-learning model may detect a specific pose of the object-of-interest when the object-of-interest is a person. The detected pose may identify a specific hand placement and arm angle of the object of interest. The specific pose of the object-of-interest may impact when the machine-learning model perceives of a specific motion.

As another example, a machine-learning model may detect that the object-of-interest is a person, and that the person is smiling and happy. By detecting that a person is happy, the machine-learning model may be able to perceive that the person is waving sooner than if the person was perceived to be angry. If the person was perceived to be angry, the person's arm movement may be more likely to be an angry gesture, and therefore it would take longer to perceive if the motion was actually a wave.

In particular embodiments, the attributes of the object-of-interest may include whether or not the object-of-interest is an individual subject or a group of subjects. As an example, if the object-of-interest is a person and that person is near a group of other people, the moment of perception of a specific action may be different than if the person was alone. For example, it may take longer to perceive that a person is waving if that person is in a crowded stadium with lots of other people cheering. However, for some actions which are more likely to occur in a crowded stadium, such as particular group cheers, the moment of perception may occur earlier in time due to the person being in a stadium with other people. Although this disclosure describes and illustrates particular attributes of the object-of-interest, this disclosure contemplates any suitable attributes of the object-of-interest.

In particular embodiments, attributes of the specified motion may be used as factors to calculate the moment of perception. Attributes of the specified motion may include the obviousness of the specified motion, the variation of the object-of-interest, or the length in time or duration of the specified motion. As an example, a person winking may be a subtle motion which can be difficult to differentiate from a person blinking, which may cause a later moment of perception. As another example, there may be more variations in a person waving compared to a person giving a thumbs up, which can cause the moment of perception of a wave to be different than the moment of perception of a thumbs up. Although this disclosure describes and illustrates particular attributes of the specified motion, this disclosure contemplates any suitable attributes of the specified motion.

In particular embodiments, metadata of the input video may be used as factors to calculate the moment of perception. Metadata of the input video may include the frame rate, resolution, data format, or EXIF data of the input video. As an example, the metadata of the input video may be used to determine when the video was taken, as different video formats and frame rates may have changed over time. Determining when the input video was taken is helpful because certain motions may have changed over time, or become more or less prevalent, which can affect the moment of perception. As another example, the metadata of the input video may determine what type of input device took the video, as small mobile devices may have different resolutions than larger commercial video cameras. Although this disclosure describes and illustrates particular metadata of the input video, this disclosure contemplates any suitable metadata of the input video.

In particular embodiments, detected events may be used as factors to calculate the moment of perception. Detected events may include prior detected events or contemporaneously detected events. For example, if the input video displays two people, and depicts a first person waving to the second person, the moment of perception of the second person waving back will likely be sooner than if the first person had not waved to the second person, as waving back may be a common response to a person being waved at. As another example, if the input video displays two people, and the first person starts raising their hands above their head and cheering, the moment of perception that the second person joins the first person in cheering will likely be sooner than if the first person was not cheering. Although this disclosure describes and illustrates particular detected events, this disclosure contemplates any suitable detected events.

In particular embodiments, the videos may be labeled with an indication of whether or not the specified motion was confirmed. In particular embodiments, the videos may be labeled with a type of the specified motion. As an example, there may be different types of waving gestures across different cultures. These types of waves may be classified for example as palm-inward waves or palm-outward waves. Waves may also be classified as fingers-together waves or fingers-apart waves. Labeled videos with specific types of specified motions may help the machine-learning models determine a more accurate moment of perception. In particular embodiments, each of the frames in the videos may be labeled with a frame sequence number.

In particular embodiments, the trained machine-learning model may be a binarized machine-learning model. In particular embodiments, the trained machine-learning model may be based on one or more of a neural-network model, a long short-term memory model, a support vector machine, a regression model, or a graph model.

In particular embodiments, the input video may contain more than one object. In particular embodiments, the method may detect the one or more potential objects, and identify one or more of the potential objects as the object-of-interest. For example, the input video may contain a group of people, but only one person in the group is significant and therefore the object-of-interest.

In particular embodiments, the object-of-interest may be identified based on factors relating to potential objects in the input video. The factors used to determine the object-of-interest may include the location in the frame of each potential object, a size of each potential object, or a significance of each potential object. For example, the input video may contain a first person close to the camera and a second person farther away from the camera. The machine-learning model may determine that the first person closer to the camera is the object-of-interest because they are closer. Although this disclosure describes and illustrates particular factors used to determine the object-of-interest, this disclosure contemplates any suitable factors.

In particular embodiments, the method may further comprise identifying a second object-of-interest depicted in the input video. The method may then detect a second motion of the second object-of-interest, and determine if the second motion of the second object-of-interest is a specified second motion. The method may then use the trained machine-learning model to classify one of the frames of the input video as the second moment of perception of the specified motion. In particular embodiments, the first motion and the second motion may both be parts of one conjoined motion. For example, two people may be high-fiving each other, wherein each person performs one half of the high five. Although this disclosure describes and illustrates particular conjoined motions, this disclosure contemplates any suitable conjoined motions.

In particular embodiments, the object-of-interest may be comprised of a plurality of separable objects. The specified motion may be done by one or more of the separable objects. For example, the object of interest may be a cheerleading team. The cheerleading team may be doing a choreographed move involving multiple members of the cheerleading team to launch a member of the cheerleading team into the air. Each member of the cheerleading team may have an individual motion which makes up the specified motion. Although this disclosure describes and illustrates particular separable objects, this disclosure contemplates any suitable separable objects.

In particular embodiments, the input video may contain audio. Each frame of the input video may be linked with an audio clip. The method may use the audio clip as a factor in determining the moment of perception. The method may also use the latency between the input video and the audio as a factor in determining the moment of perception. For example, an input video of two people dancing may contain audio of music. The music may start before the two people start dancing. The audio may make the moment of perception earlier than if there was no audio with the input video.

Figure 2:
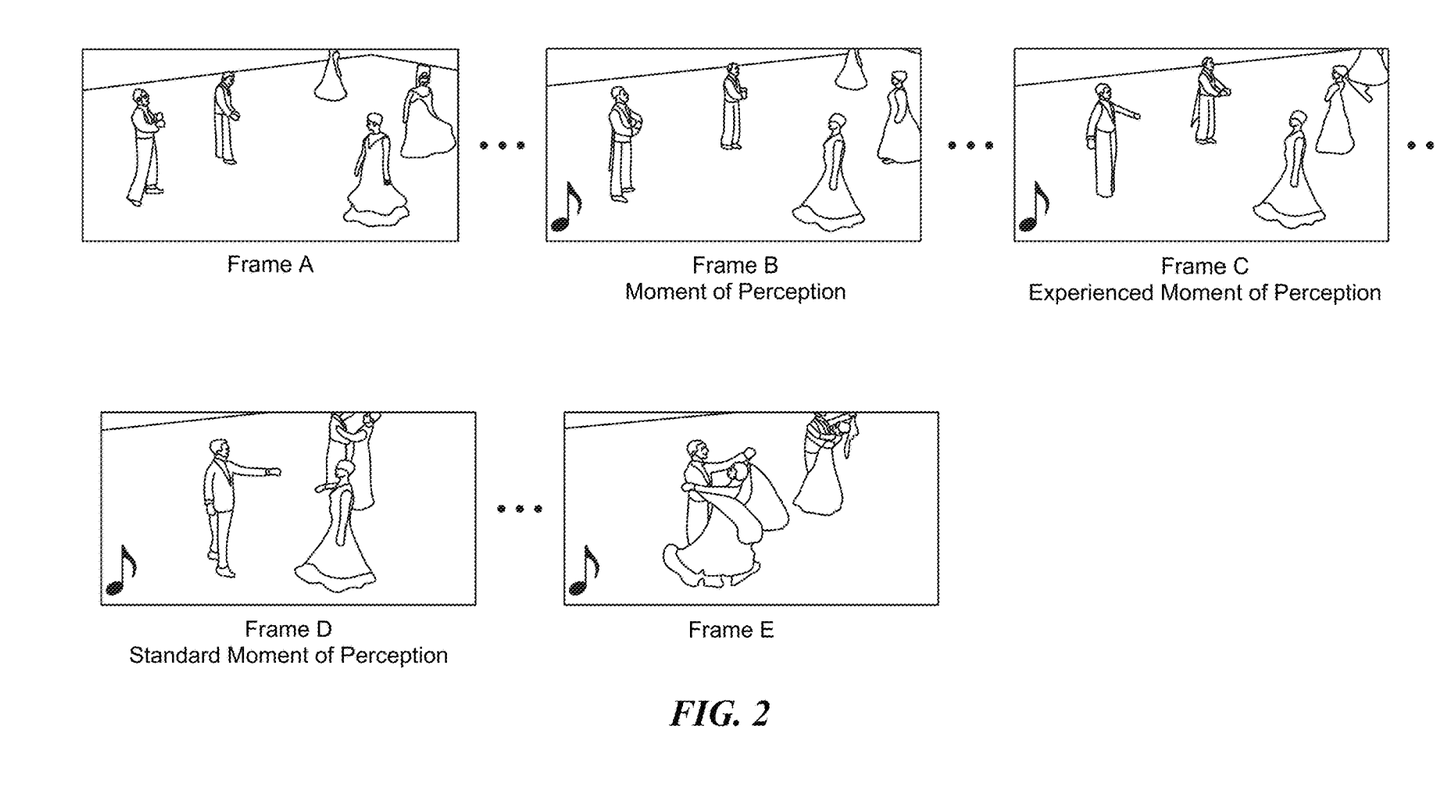
FIG. 2 illustrates an example of the method for determining the moment of perception with multiple objects in the video.

FIG. 2 illustrates an example of a method for determining the moment of perception from an input video containing multiple objects by depicting a series of frames showing multiple dancers engaging in a ballroom dance. The machine-learning model may determine that the two dancers in the foreground are the objects-of-interest. Frame A may show the two main dancers far apart. Frame B may show the two main dancers far apart, but may indicate that ballroom music has started to play. A machine-learning model may determine that Frame B is the moment of perception based in part on the audio. Frame C depicts one of the dancers extending his arm to his partner. Frame C may be the moment of perception for a human familiar with ballroom dancing etiquette. Frame D depicts the dancers closer together preparing to dance. Frame D may be the standard moment of perception for a person unfamiliar with the specifics of ballroom dancing, and who may not have considered the audio as a factor. Frame E depicts the two dancers beginning to dance, thus confirming the specific motion.

In particular embodiments, the method may involve determining the moment of perception based in part on an input video containing audio. The moment of perception may be different for different humans depending on an individual human's experience with the subject matter. The moment of perception may be different depending on whether or not the video contains audio.

Figure 3:
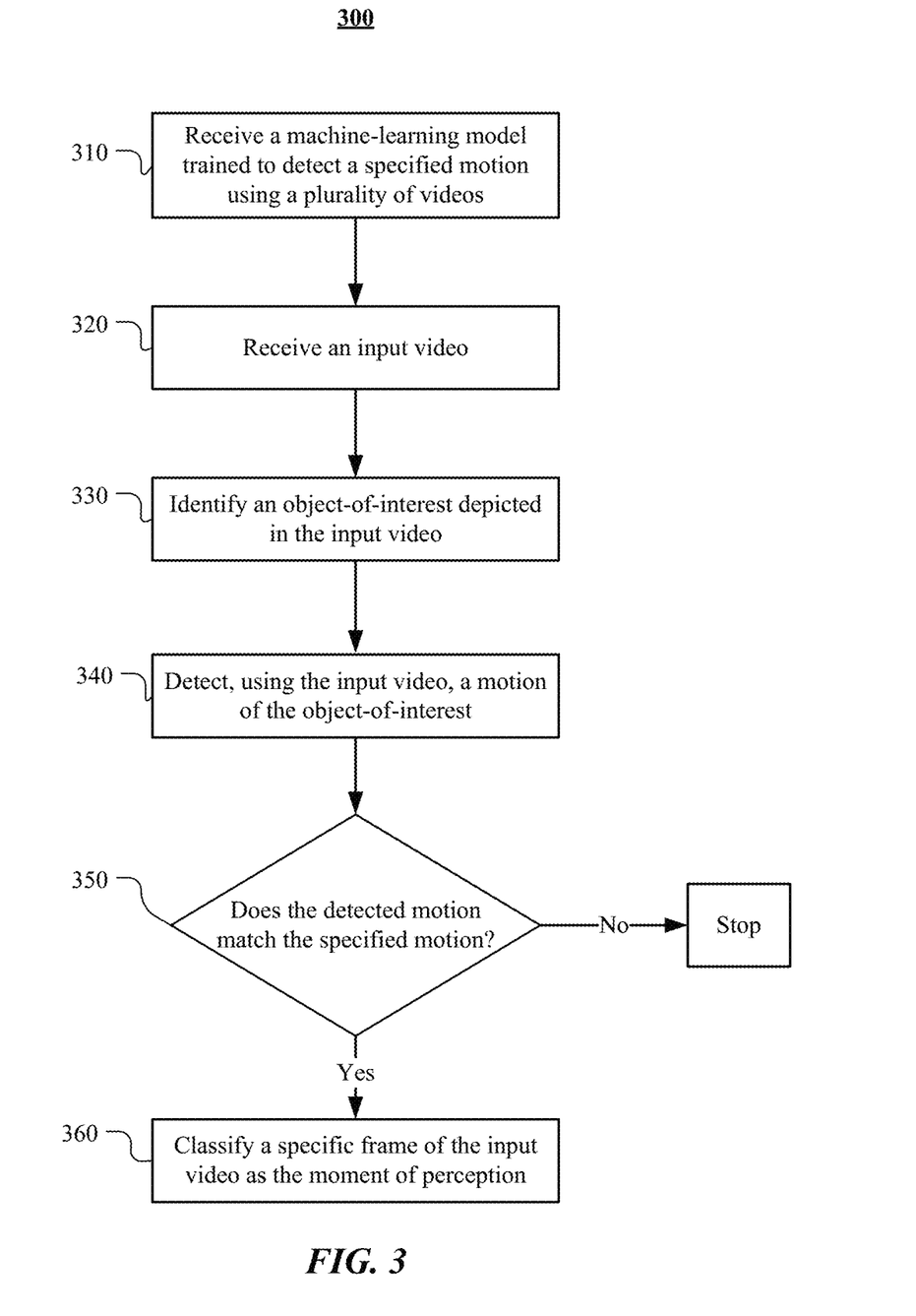
FIG. 3 illustrates an example of the method for determining the moment of perception.

FIG. 3 illustrates an example method 300 for determining the moment of perception from an input video. The method may begin at step 310, where the computing system may receive a machine-learning model which is trained to detect a specified motion using a plurality of videos. At step 320, the computing system may receive an input video. At step 330, the computing system may identify an object-of-interest that is depicted in the input video. At step 340, the computing system may detect, using the input video, a motion of the object-of-interest. At step 350, the computing system may determine if the motion detected is the specified motion. If the motion detected is the specified motion, then at step 360 the computing system may classify a specific frame of the input video as the moment of perception. Otherwise, the method may stop. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for determining the moment of perception from an input video including the particular steps of the method of FIG. 3, this disclosure contemplates any suitable method for determining the moment of perception from an input video including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, a computing system may leverage machine-learning models to improve the efficiency and effectiveness of multimedia data analysis. Multimedia data analysis may include the analysis of any suitable multimedia data such as text, image, video, audio, etc. Multimedia data analysis may be associated with particular applications such as object detection/recognition in images/videos, object tracking in images/videos, event detection/recognition in images/videos, segmentation in images/videos, natural language processing, etc. In particular embodiments, the machine-learning models may be supervised, semi-supervised, or unsupervised. The machine-learning models may be based on regression learning, reinforcement learning, decision trees, random forest, support vector machines, neural networks, or any suitable learning algorithms. In particular embodiments, the computing system may use neural network-based machine-learning models for multimedia data analysis. As an example and not by way of limitation, the neural network-based models may comprise one or more of convolutional neural networks, long-short term memory units, or recurrent neural networks, or any combination thereof.

A neural network is a system of interconnected artificial "neurons" that exchange messages between each other. The connections have numeric weights that are tuned during the training process, so that a properly trained network will respond correctly when presented with an image or pattern to recognize. The network consists of multiple layers of feature-detecting "neurons". Each layer has many neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger function (for example, using a sigmoid response function). Deep neural networks (DNN) have shown significant improvements in several application domains including computer vision and speech recognition. In computer vision, a particular type of DNN, known as a Convolutional Neural Network (CNN), has demonstrated state-of-the-art results in image and video analysis.

A convolutional neural network (CNN) is a special case of the neural network described above. A CNN consists of one or more convolutional layers, often with a subsampling layer, which are followed by one or more fully connected layers, as in a standard neural network. Convolutional neural networks (CNN) have been used for purposes of text/audio/image/video processing and have shown reliable results in different tasks that are useful in real world applications. Convolutional layers are useful for text/audio/image/video processing, as they extract features from these multimedia data relatively quickly and learn to extract the right features for the problem they are trained on (e.g., convolutional layers trained for classification may learn different filters (i.e., weights) than layers trained for regression, because different aspects or characteristics matter in each of those scenarios).

Figure 4:
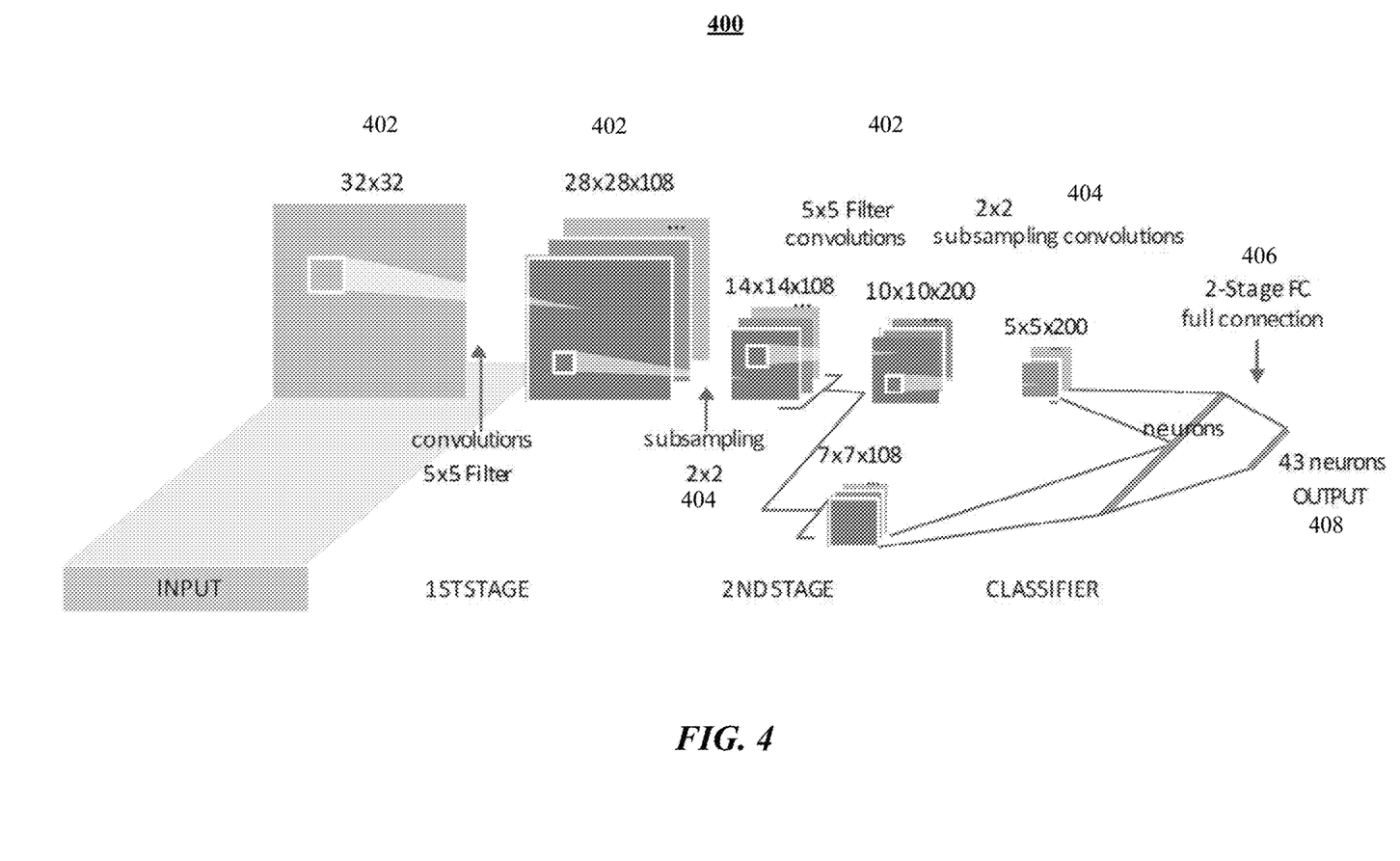
FIG. 4 illustrates an example architecture of a convolutional neural network (CNN) model.

FIG. 4 illustrates an example architecture of a convolutional neural network (CNN) model 400. FIG. 4 shows one or more convolutional stages 402, sub-sampling 404, and fully connected stages 406 leading to the production of an output 408. As shown in FIG. 4, input data (such as a digitized representation of an image) is provided to one or more convolutional stages 402 (represented as "1st Stage" and "2nd Stage" in the figure). The output of each convolutional stage is provided as an input to the following stage;

in some cases, further subsampling operations 404 may be carried out. A final subsampling stage acts as a Classifier, with an output being passed to one or more fully connected stages 406 to produce an output 408.

In a CNN, convolution layers play the role of feature extractor, with the convolution filter kernel-weights being determined as part of the training process. Convolutional layers are able to extract the local features because they restrict the receptive fields of the hidden layers to be local. The weights of the convolutional layer used for feature extraction, as well as the fully connected layer used for classification, are determined during a training process.

By stacking multiple and different layers in a CNN, complex architectures may be built for different problems (e.g., classification). Four types of layers are most common: convolution layers, pooling/subsampling layers, non-linear layers, and fully connected layers. The convolution operation extracts different features of the input. The first convolution layer extracts low-level features such as edges, lines, and corners; higher-level layers extract higher-level features. The pooling/subsampling layer operates to reduce the resolution of the features and makes the features more robust against noise and distortion. There are two ways to do pooling: max pooling and average pooling. Neural networks in general (and CNNs in particular) rely on a non-linear "trigger" function to signal distinct identification of likely features on each hidden layer. CNNs may use a variety of specific functions, such as rectified linear units (ReLUs) and continuous trigger (non-linear) functions, to efficiently implement this non-linear triggering function. Fully connected layers are often used as the final layers of a CNN. These layers mathematically sum a weighting of the previous layer of features, indicating the precise mix of factors to determine a specific target output result. In case of a fully connected layer, all of the elements of all the features of the previous layer are used in the calculation of each element of each output feature. The final layers decode the network output and are determined by the task. As an example and not by way of limitation, for image classification, a set of probabilities is output using a classifier where the argmax is the most likely label for the input image. In object detection, class probabilities, bounding box coordinates, and their size are output.

In particular embodiments, the computing system may use a compressed CNN model which may be suitable for a computing platform with low power and low memory. As an example and not by way of limitation, the computing platform may comprise a field-programmable gate array (FPGA). The compressed CNN model may be suitable for smaller devices such as cell/smart phones, tablet computing devices, embedded electronic devices, smart wearable devices in virtual reality and augmented reality, etc. In particular embodiments, the computing system may integrate fusion and quantization when training the compressed CNN model. In particular embodiments, the computing system may perform quantization for both the convolutional layers and the batch normalization layers of a CNN model. For a convolutional layer, the computing system may quantize the floating-point input of this layer and the relevant weights/parameters to a low-bit (e.g., 8 bits or less) fixed-point number. For a batch normalization layer, the computing system may normalize input data based on specific means and variances which are tied to particular parameters and then similarly quantize the normalized data to a low-bit fixed-point number. In addition, the computing system may fuse the quantized convolution with a scaling factor associated with the batch normalization. The computing system may further quantize the fusion result to complete the compressed CNN model.

In particular embodiments, the computing system may use a binarized CNN model which may be computationally efficient for implementing convolutional operations. The computing system may perform one or more binary convolutions between a binarized input and binarized weights to generate the output corresponding to the particular task. In binary convolution, both weights and input activation space into binary (+1 or −1). To accelerate training time and to improve training accuracy, batch normalization may normalize input batches to have zero mean and unit variance. During training time, several constants for multiplication and biases may be learned. Then, at inference time, these constants may be folded into a simpler algebraic expression resulting in a fused-multiply-and-add per input value. In particular embodiments, the binarized CNN model may be based on binarization. Binarization may extract the sign of a real-valued input and packs it into a bitarray. Values greater than 0 are represented as "0b1", else it is "0b0". As an example and not by way of limitation, the input may comprise a plurality of values. Accordingly, binarizing the input may comprise extracting, for each of the plurality of values, a sign associated with the value, and packing, for each of the plurality of values, the extracted sign into a bitarray.

Figure 5:
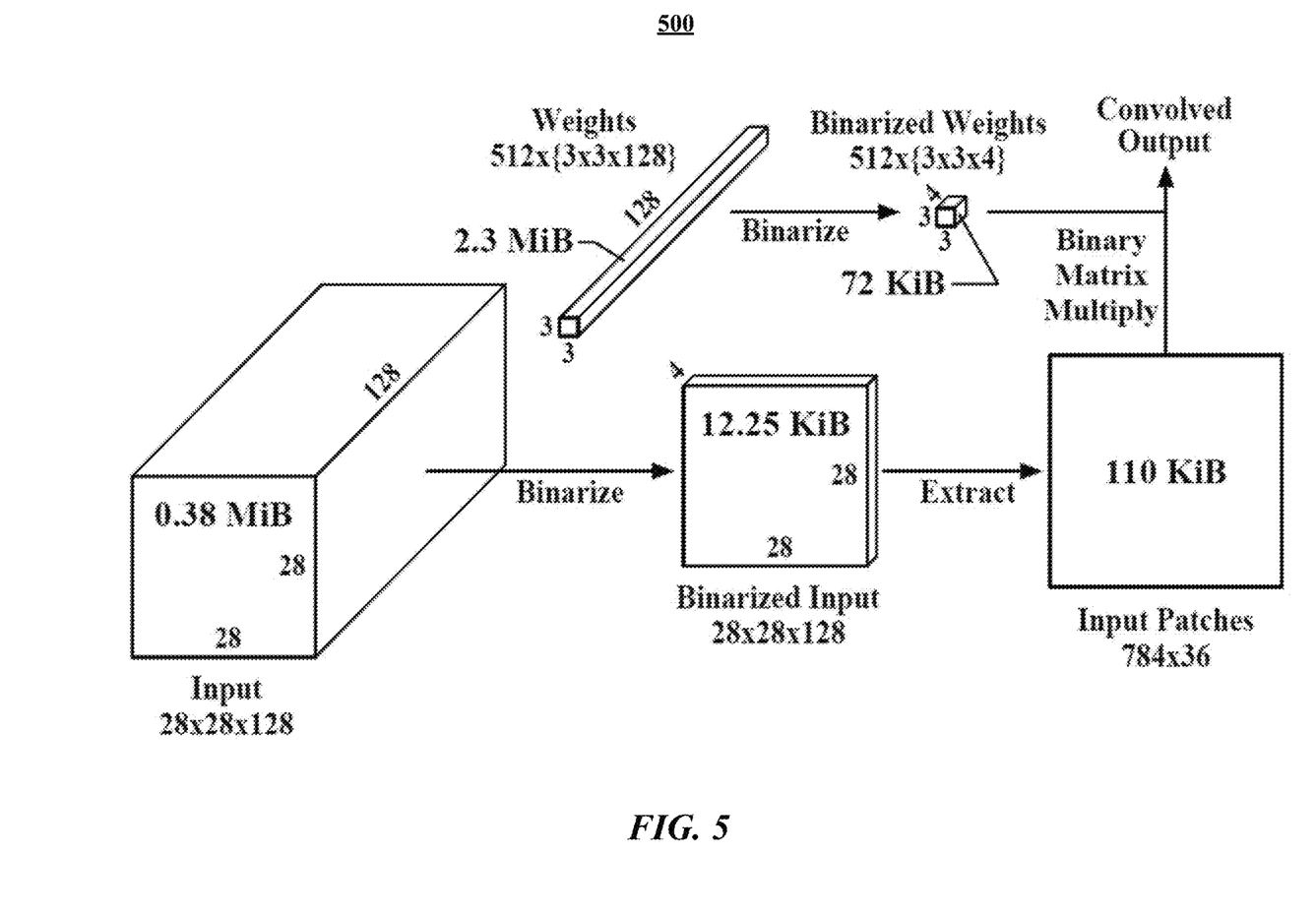
FIG. 5 illustrates an example visualization of a convolution layer in a binarized CNN model.

FIG. 5 illustrates an example visualization of a convolution layer in a binarized CNN model. As an example and not by way of limitation, FIG. 5 shows that a convolution layer of size 28×28×128 with 512 output filters and a filter size of 3. Mebibyte (MiB) is a unit of measurement used in computer data storage. The prefix mebi comes from the binary system of data measurement that is based on powers of two. A mebibyte equals 220 or 1,048,576 bytes. Most of the memory savings may occur at the binarization step where the channel dimension in both input and weights are shrunk by a factor of 32. Binary convolution may use significantly less memory while improving performance. The data type size is 32 bits and all rectangular parallelepipeds are drawn in proportion to each other with an x:y:z ratio of 2:2:1.

In particular embodiments, the computing system may store a machine-learning model in a binary inference engine. The computing system may further combine both the binary inference engine and its associated model data in a single module, such that the entire engine/model are self-contained in a single module. In particular embodiments, the single module may be stored as a particular file comprising one or more of a dynamic link library (dll) file or an extended binary (xb) file. A dll/xb file may be used for holding multiple codes and procedures. As an example and not by way of limitation, a user may use an application running on a client device or a computer attached to a video camera and speaker. The application may dynamically link to an xb file. The user may use the application to classify a scene with humans in it. With the "people_detector.xb" file dynamically loaded at runtime, the application may output a wave file through the speaker that says "person." The user may further use the application to classify the emotional state of the detected person. Without recompiling the application, the computing system may swap out "people_detector.xb" file with "emotion_detector.xb" on a disk, re-launch the application, and the speaker may say "happy" or "sad." In particular embodiments, the computing system may combine the binary inference engine and the model data using a linker. As a result, at runtime the computing system may have the capability to self-extract (to memory or temporary storage) the required model (e.g., parameters, etc.). The computing system may further construct a machine-learning architecture based on declarative data in the memory or in the data portion of the particular file (e.g., xb file). In particular embodiments, a single particular file may have multiple binary inference engines. Accordingly, the computing system may enumerate them via one or more application programming interfaces (APIs). In particular embodiments, the computing system may assist users to solve a plurality of tasks efficiently and effectively by integrating machine-learning models and their relevant model data.

Figure 6:
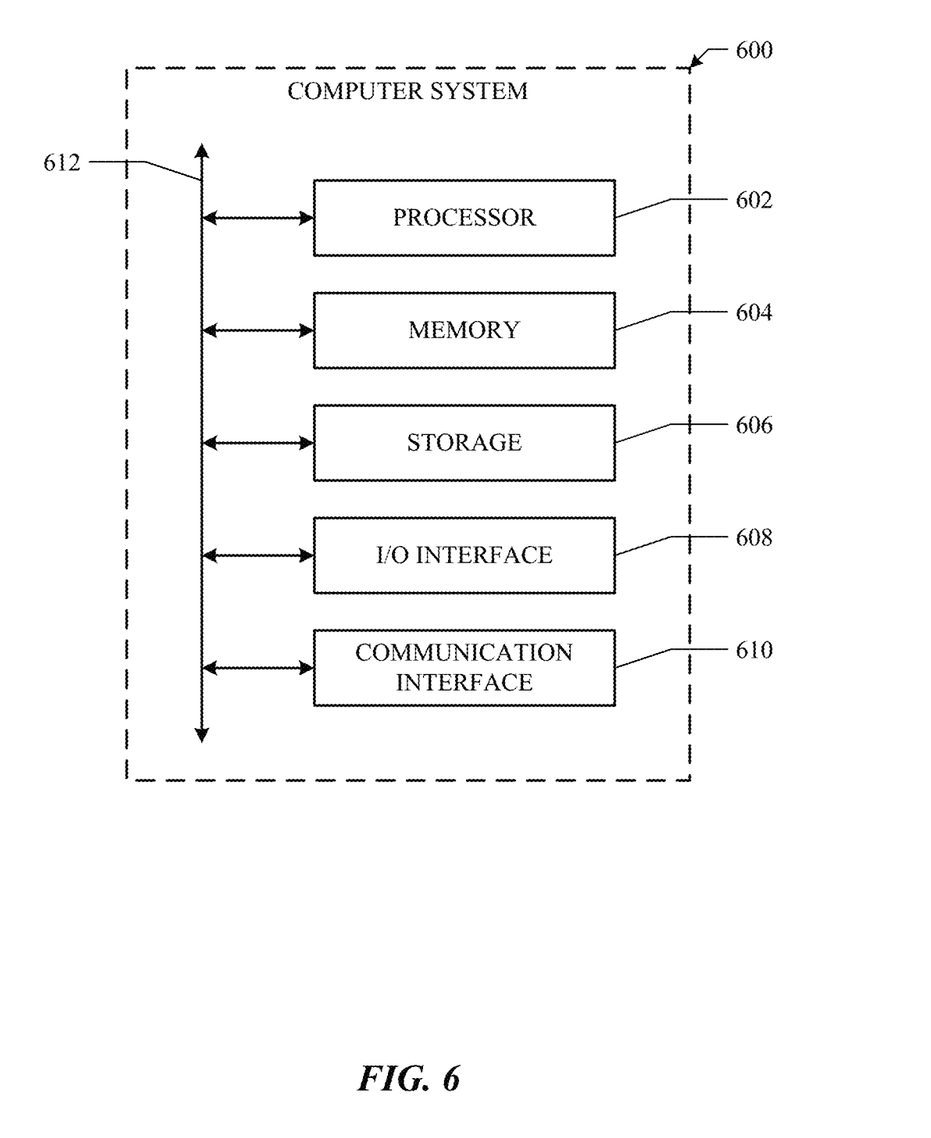
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   receiving an input video comprising a plurality of image frames including an object of interest;
   determining, based on the plurality of image frames, a motion associated with the object of interest; and
   determining, using a computing system and based at least in part on one or more factors corresponding to the input video, at least one of the plurality of image frames that indicates detection of the determined motion.

2. The method of claim 1, wherein the one or more factors of the input video comprise at least one of: (i) an environmental context of the input video, (ii) one or more attributes of the object of interest, (iii) one or more attributes of the motion associated with the object of interest, or (iv) a metadata associated to the input video.

3. The method of claim 2, wherein the environmental context of the input video comprises a climate determined from the input video.

4. The method of claim 2, wherein the one or more attributes of the object of interest comprise a temperature of the object of interest in the input video.

5. The method of claim 1, wherein the motion associated with the object of interest is based at least in part on a motion performed by one or more portions of the object of interest.

6. The method of claim 1, wherein the object of interest comprises at least one of: (i) a human, (ii) an animal, or (iii) an object.

7. The method of claim 1, wherein the object of interest comprises a combination of one or more humans, animals, or objects.

8. The method of claim 1, wherein the one or more factors comprise captions included in the input video.

9. A system, comprising:
   a processor; and
   a memory device containing instructions which, when executed by the processor, cause the processor to:
   receive an input video comprising a plurality of image frames including an object of interest;
   determine, based on the plurality of image frames, a motion associated with the object of interest; and
   determine, based at least in part on one or more factors corresponding to the input video, at least one of the plurality of image frames that indicates detection of the determined motion.

10. The system of claim 9, wherein the one or more factors of the input video comprise at least one of: (i) an environmental context of the input video, (ii) one or more attributes of the object of interest, (iii) one or more attributes of the motion associated with the object of interest, or (iv) a metadata associated to the input video.

11. The system of claim 10, wherein the environmental context of the input video comprises a climate determined from the input video.

12. The system of claim 10, wherein the one or more attributes of the object of interest comprise a temperature of the object of interest in the input video.

13. The system of claim 9, wherein the motion associated with the object of interest is based at least in part on a motion performed by one or more portions of the object of interest.

14. The system of claim 9, wherein the object of interest comprises at least one of: (i) a human, (ii) an animal, or (iii) an object.

15. The system of claim 9, wherein the object of interest comprises a combination of one or more humans, animals, or objects.

16. The system of claim 9, wherein the one or more factors comprise captions included in the input video.

17. A non-transitory computer-readable storage medium comprising instructions that, when executed by one or more processors, cause the one or more processors to perform operations comprising:
   receiving an input video comprising a plurality of image frames including an object of interest;
   determining, based on the plurality of image frames, a motion associated with the object of interest; and
   determining, using a computing system and based at least in part on one or more factors corresponding to the input video, at least one of the plurality of image frames that indicates detection of the determined motion.

18. The non-transitory computer-readable storage medium of claim 17, wherein the one or more factors of the input video comprise at least one of: (i) an environmental context of the input video, (ii) one or more attributes of the object of interest, (iii) one or more attributes of the motion associated with the object of interest, or (iv) a metadata associated to the input video.

19. The non-transitory computer-readable storage medium of claim 18, wherein the environmental context of the input video comprises a climate determined from the input video.

20. The non-transitory computer-readable storage medium of claim 18, wherein the one or more attributes of the object of interest comprise a temperature of the object of interest in the input video.

* * * * *